United States Patent
Klein

(10) Patent No.: US 12,258,853 B2
(45) Date of Patent: Mar. 25, 2025

(54) DEVICE FOR DAMPENING THE FORCE ACTING ON AN ELECTRONIC COMPONENT, AND A DRILL ROD SECTION OF A GROUND DRILLING DEVICE HAVING SUCH A DEVICE

(71) Applicant: TRACTO-TECHNIK GmbH & Co., KG, Lennestadt (DE)

(72) Inventor: Tobias Klein, Lennestadt (DE)

(73) Assignee: TRACTO-TECHNIK GmbH & Co., KG, Lennestadt (DE)

( * ) Notice: Subject to any disclaimer, the term of this patent is extended or adjusted under 35 U.S.C. 154(b) by 2 days.

(21) Appl. No.: 16/883,238

(22) Filed: May 26, 2020

(65) Prior Publication Data

US 2020/0408082 A1 Dec. 31, 2020

(30) Foreign Application Priority Data

Jun. 28, 2019 (DE) ...................... 10 2019 004 509.2

(51) Int. Cl.
*E21B 47/017* (2012.01)
*B33Y 10/00* (2015.01)
*B33Y 80/00* (2015.01)
*E21B 47/024* (2006.01)
*E21B 47/04* (2012.01)

(52) U.S. Cl.
CPC ............ *E21B 47/017* (2020.05); *B33Y 10/00* (2014.12); *B33Y 80/00* (2014.12); *E21B 47/024* (2013.01); *E21B 47/04* (2013.01)

(58) Field of Classification Search
CPC ..... E21B 47/0228; E21B 47/01; E21B 17/006
See application file for complete search history.

(56) References Cited

U.S. PATENT DOCUMENTS

| | | | | |
|---|---|---|---|---|
| 4,891,734 | A * | 1/1990 | More | H05K 7/1417 |
| | | | | 174/544 |
| 5,795,991 | A * | 8/1998 | Hesse | E21B 7/06 |
| | | | | 73/12.09 |
| 7,357,886 | B2 * | 4/2008 | Groth | H05K 7/1417 |
| | | | | 264/225 |
| 10,914,697 | B2 | 2/2021 | Hay et al. | |
| 11,046,008 | B2 * | 6/2021 | Schlüter | B65D 81/05 |
| 2003/0131992 | A1 * | 7/2003 | Michael | E21B 7/046 |
| | | | | 166/255.2 |
| 2017/0226845 | A1 * | 8/2017 | Kuroiwa | E21B 47/017 |
| 2018/0073561 | A1 * | 3/2018 | Semple | F16C 33/04 |
| 2020/0063547 | A1 * | 2/2020 | Dighe | E21B 47/07 |

FOREIGN PATENT DOCUMENTS

| | | | |
|---|---|---|---|
| DE | 19534806 A1 | 2/1997 | |
| DE | 10104336 A1 * | 8/2002 | ............ E21B 47/011 |
| DE | 112014007008 T5 | 6/2017 | |

* cited by examiner

*Primary Examiner* — Jacob J Cigna
(74) *Attorney, Agent, or Firm* — Howard IP Law Group, PC

(57) ABSTRACT

A device for dampening the action of a force on an electronic component, particularly one in the form of a probe, wherein the device comprises a receptacle space for the component, which is surrounded by an outer wall along a longitudinal axis, and transversely to the longitudinal axis there is situated an end closure of the receptacle space, wherein the outer wall and the closure comprise the same material and the material has a structural conformation which produces a dampening effect of the device in the longitudinal direction.

23 Claims, 1 Drawing Sheet

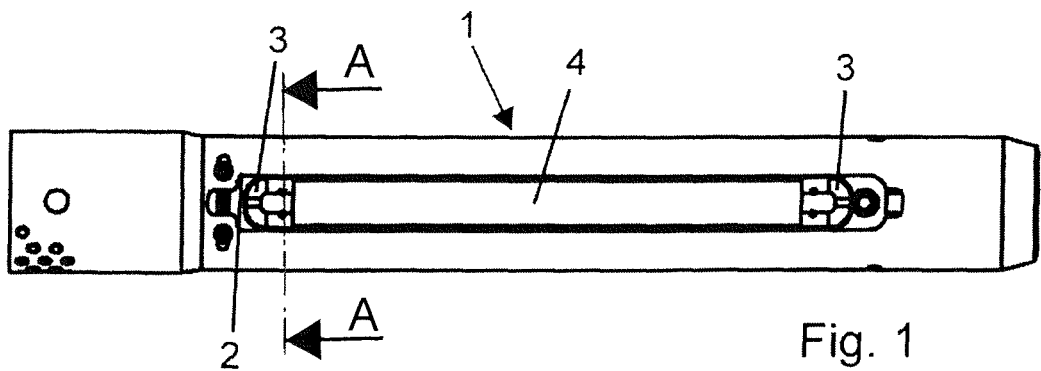
Fig. 1
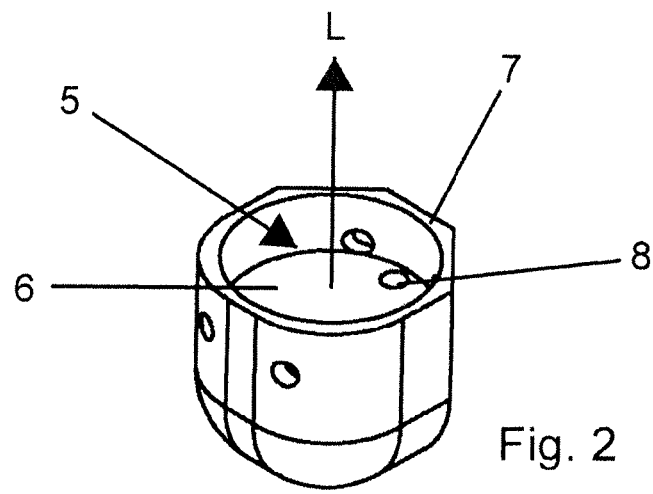
Fig. 2
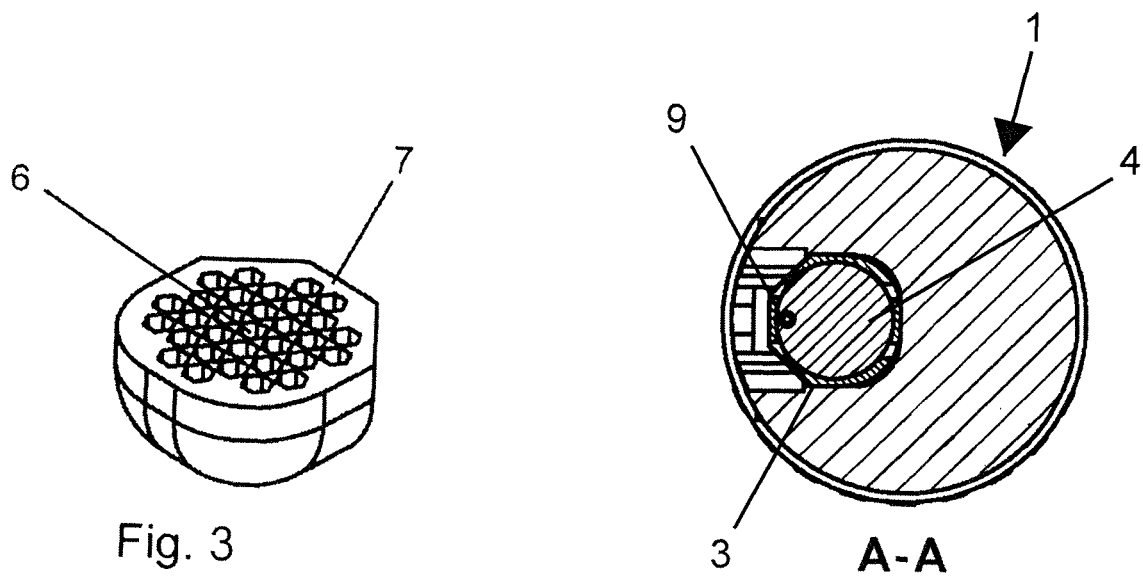
Fig. 3
Fig. 4

DEVICE FOR DAMPENING THE FORCE ACTING ON AN ELECTRONIC COMPONENT, AND A DRILL ROD SECTION OF A GROUND DRILLING DEVICE HAVING SUCH A DEVICE

FIELD OF INVENTION

The invention relates to a device for dampening the action of a force on an electronic component, where the electronic component may be present particularly in the form of a probe. The device comprises a receptacle space for the component, which is surrounded by an outer wall along a longitudinal axis. Transversely to the longitudinal axis there is situated an end closure of the receptacle space. Moreover, the invention relates to a drill string section of a ground drilling device having such a device, as well as a method for producing a device for dampening the action of a force on an electronic component.

BACKGROUND

It is known to equip ground drilling devices with an electronic component, in order to emit electromagnetic radiation. The electromagnetic radiation, particularly in the form of signals, is used in order to locate the radiation by means of a receiving unit situated on the ground surface and thereby determine the position of the ground drilling device within the soil. Besides a determination of the position of the ground drilling device within the soil, it is also possible to determine a rolling of a drill string section by means of the transmitter by ascertaining the angular position (clock time) of the drill string section. This makes it possible to continually check the lay of the borehole and—if the ground drilling device is a controllable one—to correct the lay of the borehole if it deviates from the target lay by a rerouting of the ground drilling device.

In the known ground drilling devices, a signal can accordingly be relayed by means of a transmitter or a probe to the receiver unit, containing depth and clock time. In order to protect the transmitter, which is in the form of an electronic component, against damage due to vibrations and shocks, such as can normally occur in a self-propelled percussion drilling apparatus, the transmitter is usually installed in rubber buffers in a transmitter housing. It is known that the rubber buffers generally have a very low hardness, in order to have appropriately good dampening qualities. Otherwise, the electronics of the transmitter would be disrupted on account of the high acceleration. However, the low rigidity of the rubber buffer, also known as the hardness, means that there is less rigidity in places where greater rigidity is desired, particularly in regions with little material. Due to this low rigidity, this region has little resistance to deformation, particularly a deformation initiated by means of compressive force, so that the transmitter may become detached and twist relative to the "soft material". If a twisting of the transmitter occurs relative to the transmitter housing, false signals will be sent to the receiver unit and the drilling needs to be interrupted. If a harder material is chosen for the known rubber buffer, the rigidity is still present in regions with little material and the transmitter is better secured against loosening and twisting, but the dampening is no longer sufficient, resulting in a disruption of the electronics of the transmitter.

Although a corresponding embedding of a transmitter in a drill string section has long been known in the prior art, even though reasonable results and long service life have also been possible thus far, it has been found surprisingly that a loosening or twisting of the transmitter and/or a premature damaging of the electronics of the transmitter may occur in the long run.

SUMMARY

The problem which the invention proposes to solve is to indicate an improved dampening of an electronic component, particularly one in the form of a probe. Moreover, a drill string section is to be created which improves on at least one of the aforementioned disadvantages. A method for producing the device should also be improved.

The basic idea of the invention is to create a device for the dampening of the action of a force on an electronic component, in which a material is essentially provided which is present for both the outer wall along a longitudinal axis of a receptacle space and transversely to the longitudinal axis, i.e., in an end closure of the receptacle space. The different dampening qualities or rigidities of the material for the different regions with different requirements are accomplished in that the dampening effect of the device in the longitudinal direction, i.e., basically in the region of the end closure, is influenced by means of a structural conformation of the material at the closure. The dampening of the device can be produced in different directions by means of different procedures. For example, a dampening effect of the device in the longitudinal direction can be "softer" in that the material is structured accordingly in the region of the closure. The use of a material both in the region of the outer wall along the longitudinal axis and in the region transversely to the longitudinal axis at the end closure of the receptacle space creates a device of simple construction in which the requirements in the different directions when the electronic component is subjected to a force can be taken into account. Surprisingly, it has been found that the dampening effect or the rigidity of the material can be very well manipulated by means of the structural conformation. A rigidity can be achieved which is largely independent of the intrinsic material-related rigidity. This fact for the first time allows the skilled person to both achieve a good dampening effect in certain regions and to provide a rigidity in other regions which stabilizes the electronic component, in particular, which secures or supports it with respect to a twisting, despite having an easily handled device. For the first time the prevalent opinion of the skilled person has been abandoned, that of providing a material for the dampening or accommodating of an electronic component only with a choice between the required rigidity in certain regions and the required dampening in other regions. The approach proposed here for the first time enables added value to the user, since the electronic component can be used longer and can work reliably over a longer period of time.

The invention creates a device for dampening the action of a force on an electronic component, which may be designed particularly in the form of a probe. The device comprises a receptacle space for the component, which is surrounded by an outer wall along a longitudinal axis. Transversely to the longitudinal axis there is situated an end closure of the receptacle space. The outer wall and the closure comprise the same material and the material has a structural conformation which produces a dampening effect of the device in the longitudinal direction.

The term "acting force" in the sense of the specification encompasses every mechanical action on the component which can be dampened by the device. In particular, vibrations and shocks which can be transmitted directly or indirectly come under the acting force. A dampening effect is particularly desirable in the end region of the device.

The term "electronic component" in the sense of the specification encompasses any component having electronics. In particular, the term encompasses electronic components which are used in the region of ground drilling devices in the drill string. An electronic component in the sense of the specification may be in particular a probe of a ground drilling device, by means of which an electromagnetic wave, for example one in the form of signals, is emitted and can be received by a receiver unit, particularly one situated at the ground surface. In particular, a probe can be used to ascertain the depth and the twisting of the probe, and in the case of a known position of the probe in relation to a drill string, also the depth and twisting of the drill string, in the soil.

The term "receptacle space" in the sense of the specification encompasses a cavity in which the electronic component can be situated at least partly. For example, it is possible for the component to be entirely surrounded by the device. But it is also possible in particular for an end region of the component to be exposed, and it may also be surrounded by means of a further device. Thus, a receptacle space may have an interior space adapted at least partly to the outer dimensions of the component, having in particular walls against which outer walls of the component can abut. The component may be contacted by the walls of the receptacle space. It is possible, in particular, for the walls to have apertures or holes. In particular, the device may contact the device with an end-face outer wall and an outer wall extending in the longitudinal direction of the component. In particular, the device may contact the component in a direction transverse to the longitudinal direction, so that the component is protected against twisting in the device. In particular, the outer dimensions of the component may be adapted to the inner dimensions of the device so that there is a permanent contact between the walls of the device and corresponding outer walls of the component. The shape of the walls of the device may be adapted to the shape of the outer walls of the component, for example, the outer wall of the component extending in the longitudinal direction may have a shape differing from a circular round cross section, in order to create a shape providing a deviation from a complete rotational invariance, such as an elliptical or polygonal conformation.

A "longitudinal axis" or longitudinal direction in the sense of the specification encompasses an axis of the device corresponding to the direction of its greatest extension. For example, a tubular device is possible, whose longitudinal axis coincides with the longitudinal axis of the device or is offset parallel from it.

In the sense of the specification, the term "closure" encompasses a wall by which the electronic component stands in contact or can make contact with an end face.

The term "structural conformation" in the sense of the specification encompasses a spatial or geometrical conformation which is a modification of the simple mass material which is present in bulk or in volume. For example, spatial structures or patterns are possible which can be arranged in particular periodically in space and/or symmetrically in space. In particular, the structural conformation can produce a lamellar structure, forming a region of the closure and facing toward the component for a contact. Preferably, a structure can be used having webs, lamellae, or struts, forming rectangular structures, triangular structures, wave-like structures, honeycomb structures, or similar structures. So-called minimal surfaces can also be formed. Structures known as rectilinear, grid, triangular, wiggle, fast honeycomb, full honeycomb or gyroid are possible.

In a preferred embodiment, the material is a plastic or a natural or synthetic rubber. Preferably, the material used is a thermoplastic polyurethane. A rubberlike material or a hyperelastic material can be used alternatively or additionally. An elastomer is also possible as the material; in this regard, it is possible to use an ethylene-propylene copolymer (EPM), a polyether-block-amide (PEBA), a polyhydroxyalkanoate (PHA), a polyhydroxybutyrate (PHB), a styrene-butadiene-styrene (SBS), a thermoplastic polyurethane (TPU or TPE-U), an acrylonitrile/butadiene/acrylate (A/B/A), an acrylonitrile/chlorinated polyethylene/styrene (A/PE-C/S), acrylonitrile/methyl methacrylate (A/MMA), butadiene rubber (BR), butyl rubber (IIR), chloroprene rubber (CR), ethylene-ethyl acrylate copolymer (E/EA), ethylene-propylene-diene rubber (EPDM), ethylene vinyl acetate (EVA), fluororubber (FPM or FKM), isoprene rubber (IR), natural rubber or Gummi arabicum (NR), polyisobutylene (PIB), polyvinylbutyral (PVB), silicone rubber (Q or SIR), styrene-butadiene rubber (SBR), vinyl chloride/ethylene (VC/E) or vinyl chloride/ethylene/methacrylate (VC/E/MA). Such materials are easy to manipulate and their use in this field is generally known.

In a preferred embodiment, the rigidity of the material is distributed over a broad range in a material-related manner, which can moreover be effectively modified or influenced by means of the structural conformation.

In the sense of the specification, the term "rigidity" encompasses in general the resistance of a body to deformation, particularly elastic, plastic, or hyperelastic deformation, by a force, particularly a compressive force. The physical meaning is essential here. The rigidity is associated with the pliability, which corresponds basically to the reciprocal of the rigidity. The term appears to have been used at least somewhat more broadly thus far for describing the property of the material in the case of a dampening, since the normal usage in the industry speaks of "soft" and "hard" buffers, which implies the term "hardness", which refers to the resistance to the penetrating of a body into the material. The invention has broken with this tradition, since for the first time it has been recognized that the rigidity is decisive and that the rigidity depends not only on the elastic properties of the material, but also quite considerably on the geometry.

In a preferred embodiment, the dampening effect of the device transversely to the longitudinal direction is influenced substantially by a material-related rigidity of the material. In this way, a simplified production of the device is possible in the direction transversely to the longitudinal direction, whereby an outer wall is basically present along the longitudinal axis and the dampening effect can be confined to the material itself, which is nonstructured in particular, i.e., smooth and flat. Thus, a simple conformation of the device is possible in the direction transverse to the longitudinal direction. For example, it may be provided that the material can be chosen precisely depending on the material-related rigidity such that no major modifications of the outer wall need to be done along the longitudinal axis. The rigidity can be dictated in a material-related manner in the direction transverse to the longitudinal axis.

In a preferred embodiment, the thickness of the outer wall along the longitudinal axis of the device is in the range of 0.1 mm to 4 mm, preferably 0.5 mm to 3.5 mm, further preferably 1.0 mm to 3.0 mm, particularly preferably 1.0 mm to 2.0 mm. In particular, a thickness of around 1.2 mm can be used. This makes possible an outer wall of simple construction, using little material and protecting the electronic component and/or largely preventing a twisting thanks to the bearing of the outer wall of the component against the inner wall of the outer wall.

In a preferred embodiment, the dampening effect of the device at the closure is influenced by means of a hollow structure of the material. A hollow structure affords the advantage of economizing on material, besides reducing the rigidity.

A "hollow structure" in the sense of the specification encompasses an arrangement of cavities situated alongside or on top of each other, whose walls are formed by the material. In the cavities of the hollow structure, which may be joined together in particular, with an outward opening provided, the cavities can also be closed, while the cavities have an ambient pressure, a pressure increased relative to the ambient pressure, or a pressure lower than the ambient pressure. The hollow structure can be formed by means of the above-described structures of shape, arrangement and position of struts, lamellae, webs, or similar elements delimiting the cavities in the form of rectangles, triangles, waves, honeycombs, or a gyroid.

In a preferred embodiment, the rigidity of the closure—particularly that of the hollow structure—is in the range of 0% to 40%, preferably in the range of 5% to 35%, further preferably in the range of 10% to 30%, even more preferably in the range of 15% to 30%, particularly preferably 20%, using or considering as a reference point the rigidity of the outer wall transverse to the longitudinal axis, which is present as infill relative to the volume or the layer. Thus, simply by the structural conformation in the area of the closure, it is possible to achieve a huge rigidity difference, being in the present instance a factor of 2 to 20, preferably a factor of 3 to 7, particularly preferably a factor of 4 to 6. It is thus possible to reduce the material-related rigidity by this factor through the structural conformation. Such great influence is possible even though the same material is used, and it can be utilized according to the invention for the first time in the form of a device for dampening an acting force. It should be considered that the so-called infill can be altered when producing the hollow structure—particularly by means of 3D printing. Values of 0% to 99% are possible, in regard to the individual layer, while still achieving a hollow structure. Hence, the rigidity difference between the solid material and the structural conformation at the closure may amount to 99%.

In a particularly preferred embodiment, the closure is joined to the outer wall, so that the device can be more easily handled in terms of the outer wall and the closure.

In a particularly preferred embodiment, the outer wall and the closure are made as a single piece, particularly by means of a 3D printing process, providing a particularly simple option for the production and also the handling of the device as a whole. Rigidity requirements can be taken into account in the manufacturing process and are easy to implement in the design.

The invention also creates a drill string section of a ground drilling device having an above described device. In the drill string section there is formed a receptacle for the device and the outer dimensions of the device are adapted to the dimensions of the receptacle.

The term "drill string" in the sense of the invention encompasses any means which can be introduced into the soil in order to make a borehole in the soil. In particular, the drill string may comprise a rod, a chain, and/or a cable. The term "string" encompasses in the sense of the specification not only rigid, individual strings having rod sections connected directly or indirectly to each other, but also in particular any force transmitting means which can be used in a ground drilling device. Moreover, the drill string comprises at one end, particularly the front end, a drilling head and optionally a drilling head tip or a region adjacent to the drilling head, which may have in particular the same orientation as the drilling head. In a particularly preferred embodiment, a front end segment of a drill string is configured as a drilling head, a drilling tool, or a probe housing. In particular, the drill string section may be a transmitter housing of a ground drilling device. In the sense of the specification, the term "drill string section" comprises any segment of the drill string, preferably a front-end segment of the drill string, particularly a drill string section adjacent to the drilling head. A drill string section may also be a rod section, as long as it comprises a receptacle for the device.

The term "ground drilling device" encompasses in the sense of the specification any device which moves in particular a drill string having rod sections in an existing or yet to be created conduit in the soil, in order to create or widen a borehole, particularly a horizontal borehole (HD), or to draw pipelines or other long bodies into the soil. The ground drilling device may be in particular a horizontal ground drilling device. A ground drilling device may be a device driving forward a drill string, which can work in particular by soil displacement. The ground drilling device may introduce the drill string into the soil by translatory and/or rotatory movement in the lengthwise axial direction of the drill string. An earth borehole may be introduced in the soil by applying pulling or pushing to the drill string.

The term "soil" encompasses in the sense of the present specification in particular any kind of material, particularly dirt, sand and/or rock, in which existing or yet to be created conduits or boreholes can be made, preferably being horizontal at least for a portion.

Insofar as it is specified that outer dimensions of the device are adapted to dimensions of the receptacle, this means that in particular the outer diameter in a direction transversely to the longitudinal axis corresponds substantially to an inner diameter of the receptacle, so that the device can bear with its outer surface against an inner surface of the receptacle at different points distributed about the circumference. Besides the adapting of the outer dimensions of the device to dimensions of the receptacle in a direction transverse to the longitudinal direction, the length of the device can also be adapted to the length of the receptacle so that the device bears against the contact surfaces at the end face, free of displacement in the receptacle in the longitudinal direction.

In a preferred embodiment, the drill string section is a probe housing and the electronic component is a probe.

In the sense of the specification, the mentioning of a numerical value encompasses not only the actual numerical value, but also a range about the specific numerical value, which may be +/−15%, preferably +/−10%, of the indicated numerical value—in order to allow in particular for manufacturing tolerances and/or different material batches.

In a particularly preferred embodiment, the ground drilling device may be a percussion drilling device or displacement hammer. The term "displacement hammer" may be used basically synonymously with the term "percussion drilling device". The term percussion drilling device encompasses in the sense of the specification a self-propelled percussion apparatus which works by displacement of earth and can introduce a conduit or a pipe of a drill string into the soil by percussion. Hence, the term "percussion drilling device" encompasses both earth displacement devices in which the drill head tip is firmly joined to the housing and percussion drilling devices with axially movable drill head tips mounted independently of the housing. The drill head tip may be a chisel in particular. A percussion drilling device can be both a single-stroke and a two-stroke device.

The preceding remarks, as well as the following specification of exemplary embodiments, do not constitute any abandonment of particular embodiments or features.

BRIEF DESCRIPTION OF THE DRAWINGS

The invention shall be explained more closely in the following on the example of an exemplary embodiment shown in the drawings.
The Drawings Show:
FIG. 1 is a drill string section with a receptacle, in which a device for the dampening of an acting force and an electronic component are situated;
FIG. 2 is the device shown in FIG. 1 in a sectioned and enlarged representation;
FIG. 3 is a further detail of the device shown in FIG. 2; and
FIG. 4 is a sectional representation along the cross section A-A of FIG. 1.

DETAILED DESCRIPTION

FIG. 1 shows a drill string section 1 of a ground drilling device in partially sectional representation. In the drill string section 1 there is formed a receptacle 2 for a device 3. The device 3 is designed for the dampening of a force acting on an electronic component 4 arranged at least partly in the device 3. The component 4 may be designed in the form of a probe, which can be used to ascertain the depth and the rolling or angle of roll (clock time) of the drill string section 1.

The electronic component 4 is arranged at least partly in the device 3. The device 3 comprises a receptacle space 5 for the electronic component 4 (see FIG. 2). The device 3 has a closure 6 at the end face, which can come into contact with an end face of the electronic component 4. An outer wall 7 extends from the closure 6 along a longitudinal axis L.

The electronic component 4 can be introduced into the device 3 through an opening which is formed opposite the closure 6. The direction of insertion corresponds here basically to the longitudinal axis L.

The end closure 6 of the receptacle space 5 lying transversely to the longitudinal axis L has a structural conformation fashioned as a hollow structure (see FIG. 3). In this way, a region of lesser rigidity is present at the closure 6 in the longitudinal direction L, due to less material and appropriate supporting structures in the form of lamellae.

FIGS. 2 and 4 illustrate the prevention of twisting of the component 4. Here, FIG. 4 shows in magnified view the section A-A of FIG. 1. To prevent the device 3 from twisting in the receptacle 2, an asymmetrical outer contour is provided (see FIG. 2). In this way, the device 3 can be prevented from twisting in the receptacle 2 in the drill string section 1. To prevent the twisting of the electronic component 4 in the device 3, a tensioning pin 9 is provided, which is led through a longitudinal borehole 8 of the device 3 (see FIG. 2) and engages in a groove of the component 4. In this way, a reference position can be created, so that the component 4 is prevented from twisting in the device 3 and the device 3 is prevented from twisting in the receptacle 2.

The invention claimed is:

1. A device for dampening the action of a force on an electronic component, wherein the device comprises a receptacle space for the component, which is surrounded by an outer wall along a longitudinal axis (L), and transversely to the longitudinal axis (L) there is situated an end closure of the receptacle space, wherein a same material defines the outer wall and the end closure, wherein the material has a structural conformation which produces a dampening effect of the device in the longitudinal direction (L), the dampening effect in the longitudinal direction being different from a dampening effect of the outer wall, and
  wherein the dampening effect of the device is influenced in the longitudinal direction (L), at least at the closure, by means of a hollow structure of the material; and
  wherein the device end closure further comprises an asymmetrical outer contour adapted to prevent the device from twisting in a receptacle in a drill string section of a ground drilling device.

2. The device according to claim 1, wherein the material is a thermoplastic polyurethane.

3. The device according to claim 1, wherein the dampening effect of the device transversely to the longitudinal direction (L) is influenced substantially by a material-related rigidity of the material.

4. The device according to claim 1, wherein the thickness of the outer wall lies in the range of 0.1 mm to 4 mm.

5. The device according to claim 1, wherein the rigidity of the closure lies in the range of up to 40%.

6. The device according to claim 1, wherein the closure is connected to the outer wall.

7. The device according to claim 1, wherein the outer wall and closure are made as a single piece.

8. The device according to claim 1, wherein the electronic component is an electronic probe.

9. The device of claim 1, wherein the dampening effect of the outer wall is influenced substantially by a material-related rigidity of the material.

10. The device of claim 1, wherein the device end closure further comprises a bore hole formed on an end face thereof and adapted to receive a pin for engaging in a groove of the component to prevent twisting of the component in said device.

11. The device of claim 1, further comprising an opening defining an end of the outer wall along the longitudinal axis, the opening opposite the end closure and configured to receive the component for insertion into the receptacle space of the device along the longitudinal axis.

12. The device of claim 1, wherein the outer wall is nonstructured, and the end closure comprises a hollow structure.

13. The device of claim 12, wherein the hollow structure comprises walls defining cavities.

14. A drill string section of a ground drilling device having a device for dampening the action of a force on an electronic component and comprising a receptacle space for the component, which is surrounded by an outer wall along a longitudinal axis (L), and transversely to the longitudinal axis (L) there is situated an end closure of the receptacle space, wherein a same material defines the outer wall and the end closure and the material has a structural conformation which produces a dampening effect of the device in the longitudinal direction (L), the dampening effect in the longitudinal direction being different from a dampening effect of the outer wall, wherein the dampening effect of the device is influenced in the longitudinal direction (L), at least at the closure, by means of a hollow structure of the material, and wherein the receptacle for the device is formed in the drill string section and the outer dimensions of the device are adapted to the dimensions of the receptacle.

15. The drill string section of claim 14, wherein the outer wall and the end closure are made as a single piece.

16. The drill string section of claim 14, wherein the outer wall is nonstructured, and the end closure comprises a hollow structure.

17. The drill string section of claim 14, wherein the electronic component is an electronic transmitter or probe.

18. A method for producing a device for dampening the action of a force on an electronic component wherein the device comprises a receptacle space for the component, which is surrounded by an outer wall along a longitudinal axis (L), and transversely to the longitudinal axis (L) there is situated an end closure of the receptacle space, wherein a same material defines the outer wall and the closure, wherein the method comprises three dimensional (3D) printing the region in the closure and the outer wall, by which the material at the closure is given a structural conformation and the structural conformation produces a dampening effect of the device in the longitudinal direction (L), the dampening effect in the longitudinal direction being different from a dampening effect of the outer wall, wherein the dampening effect of the device is influenced in the longitudinal direction (L), at least at the closure, by means of a hollow structure of the material, wherein the method further includes forming an asymmetrical outer contour to prevent the device from twisting in a receptacle in a drill string section of a ground drilling device.

19. The method according to claim 18, wherein the electronic component is an electronic probe.

20. The method of claim 18, wherein the outer wall and the end closure are made as a single piece.

21. The method of claim 18, wherein the outer wall is nonstructured, and the end closure comprises a hollow structure.

22. The method of claim 18, wherein the step of three dimensional (3D) printing the region in the closure and the outer wall further comprises forming an opening at an end of the outer wall along the longitudinal axis, the opening opposite the end closure and configured to receive the component into the receptacle space of the device along the longitudinal axis.

23. The method of claim 18, further comprising forming a bore hole on an end face of the end closure and connecting a pin to engage in a groove of the component to prevent twisting of the component in said device.

* * * * *